FIG. 14
FIG. 13
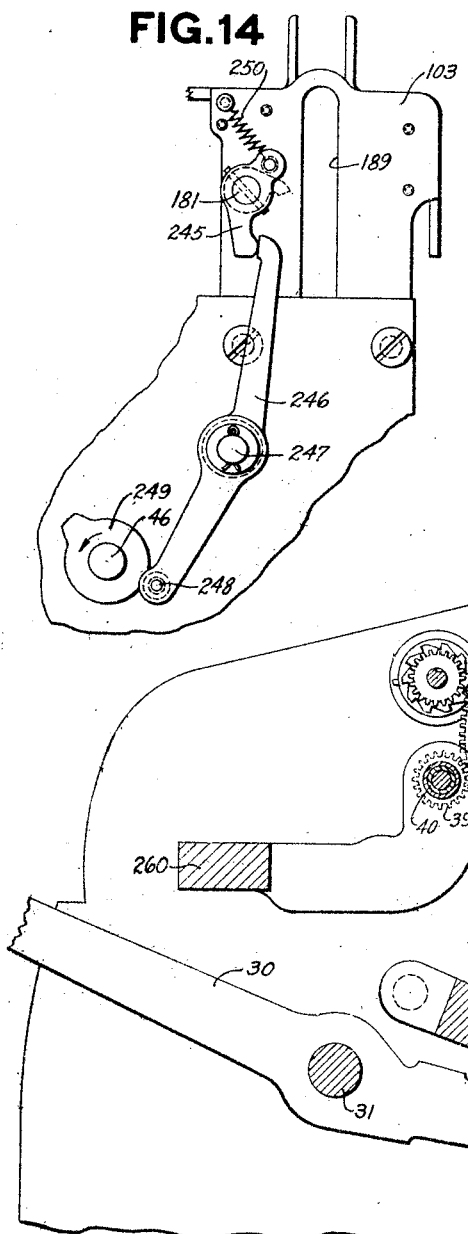
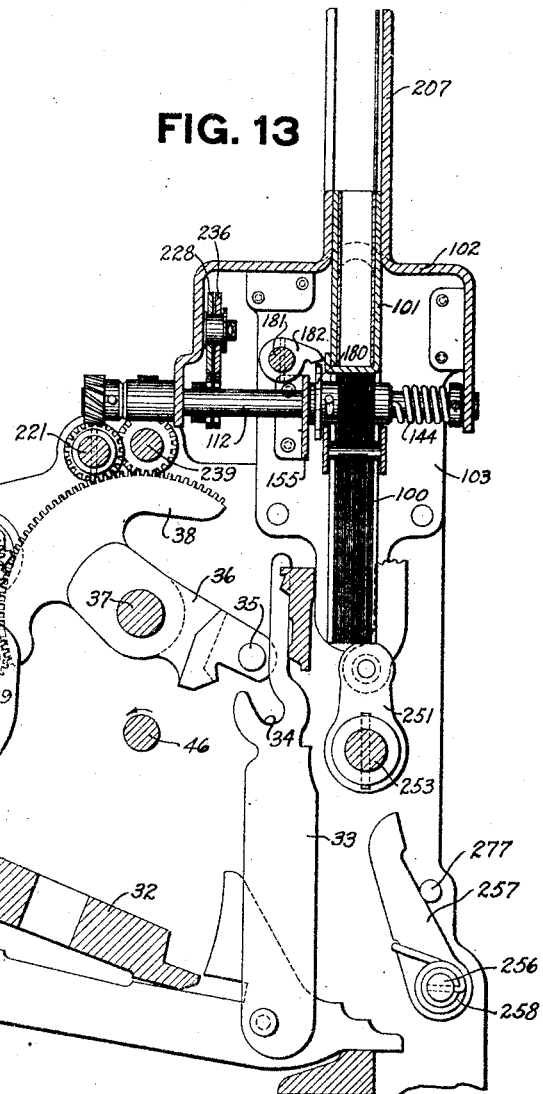

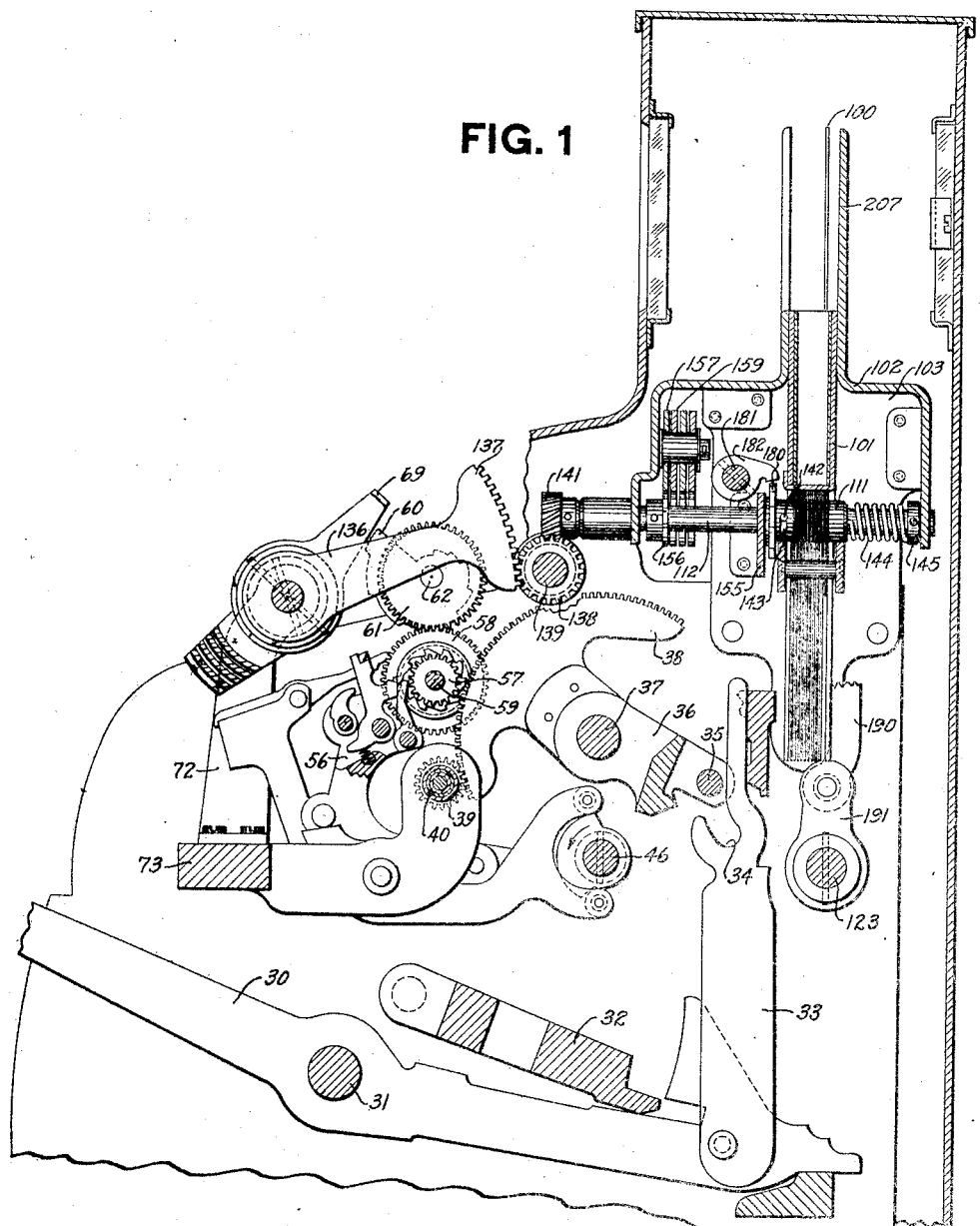

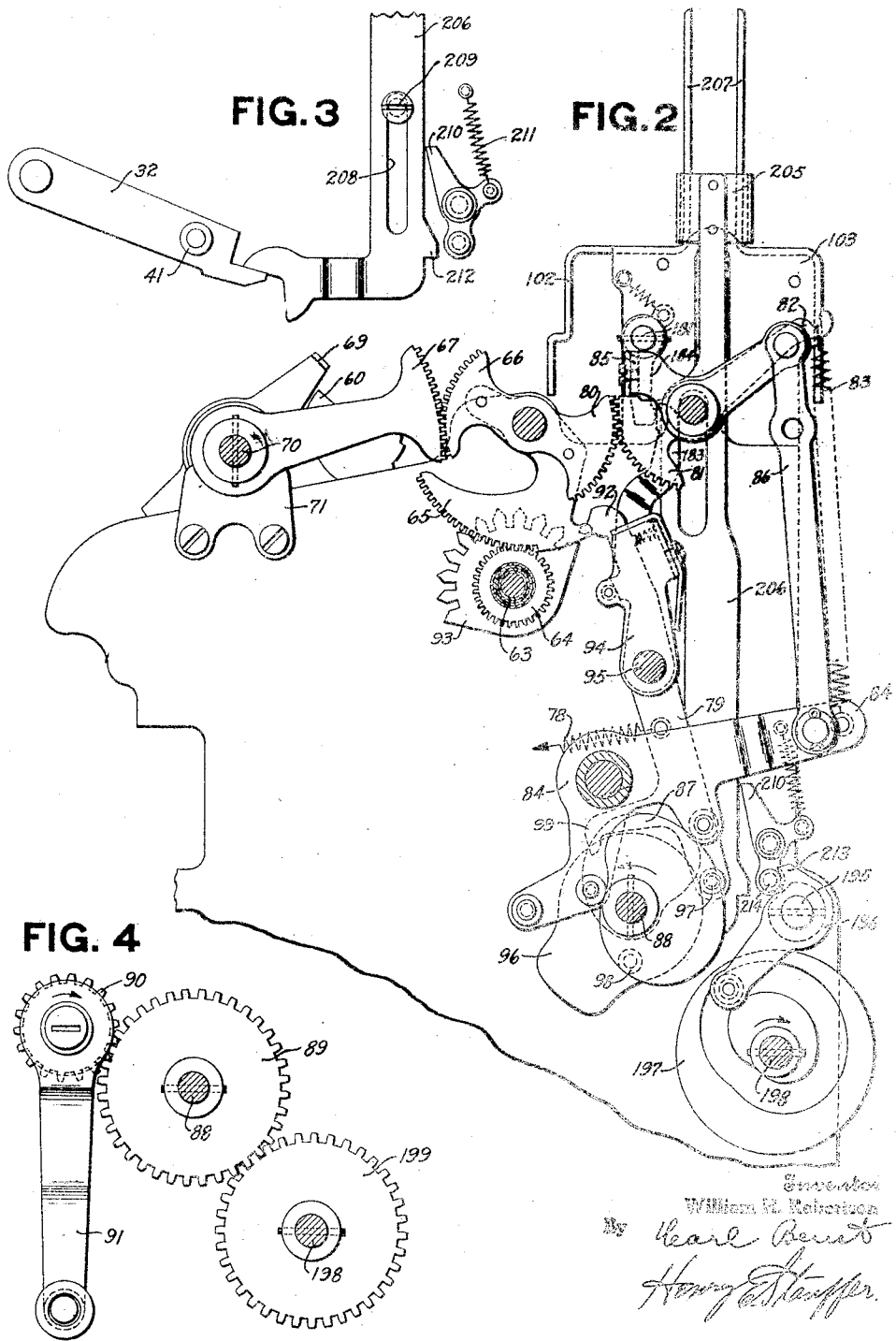

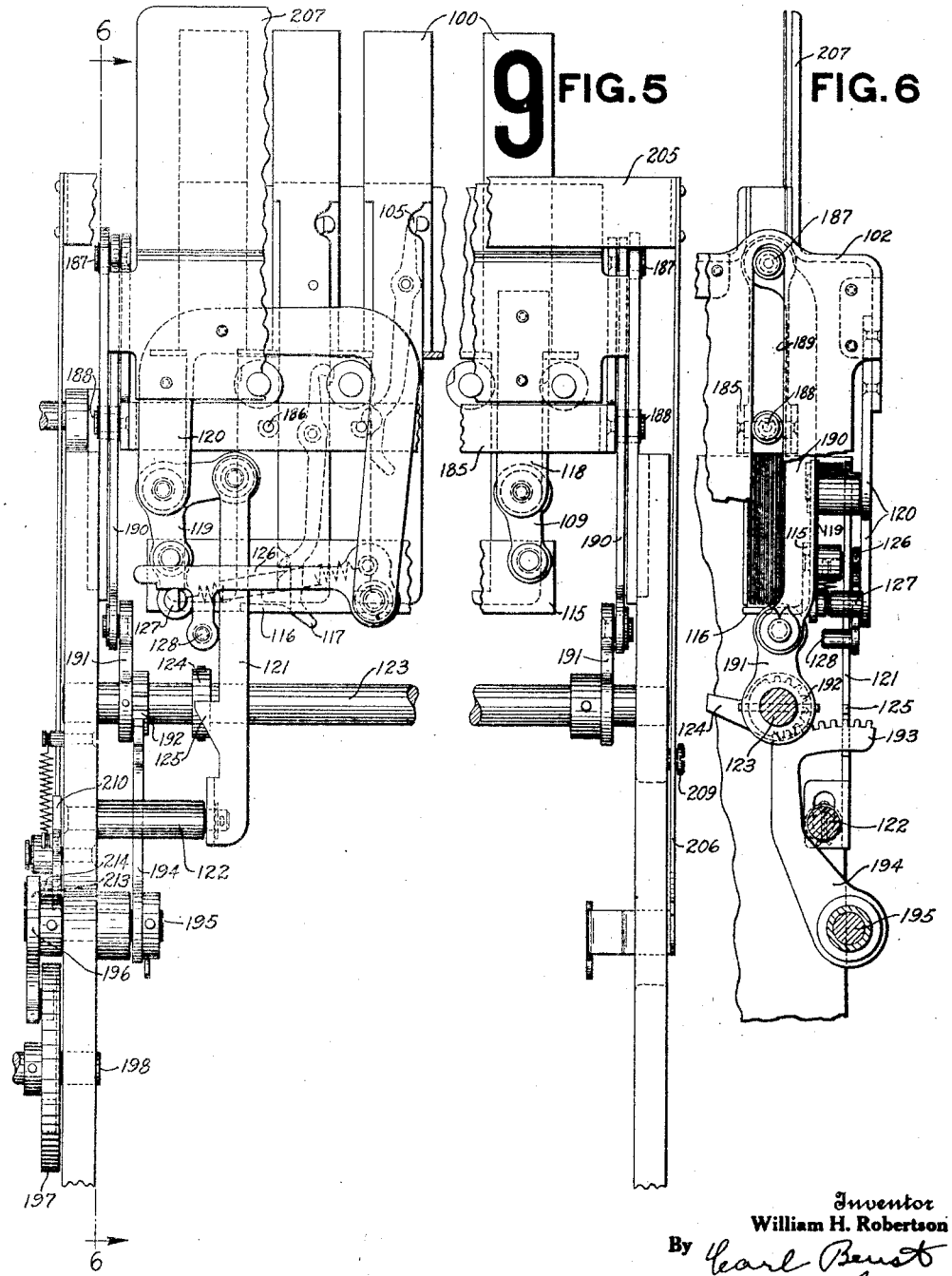

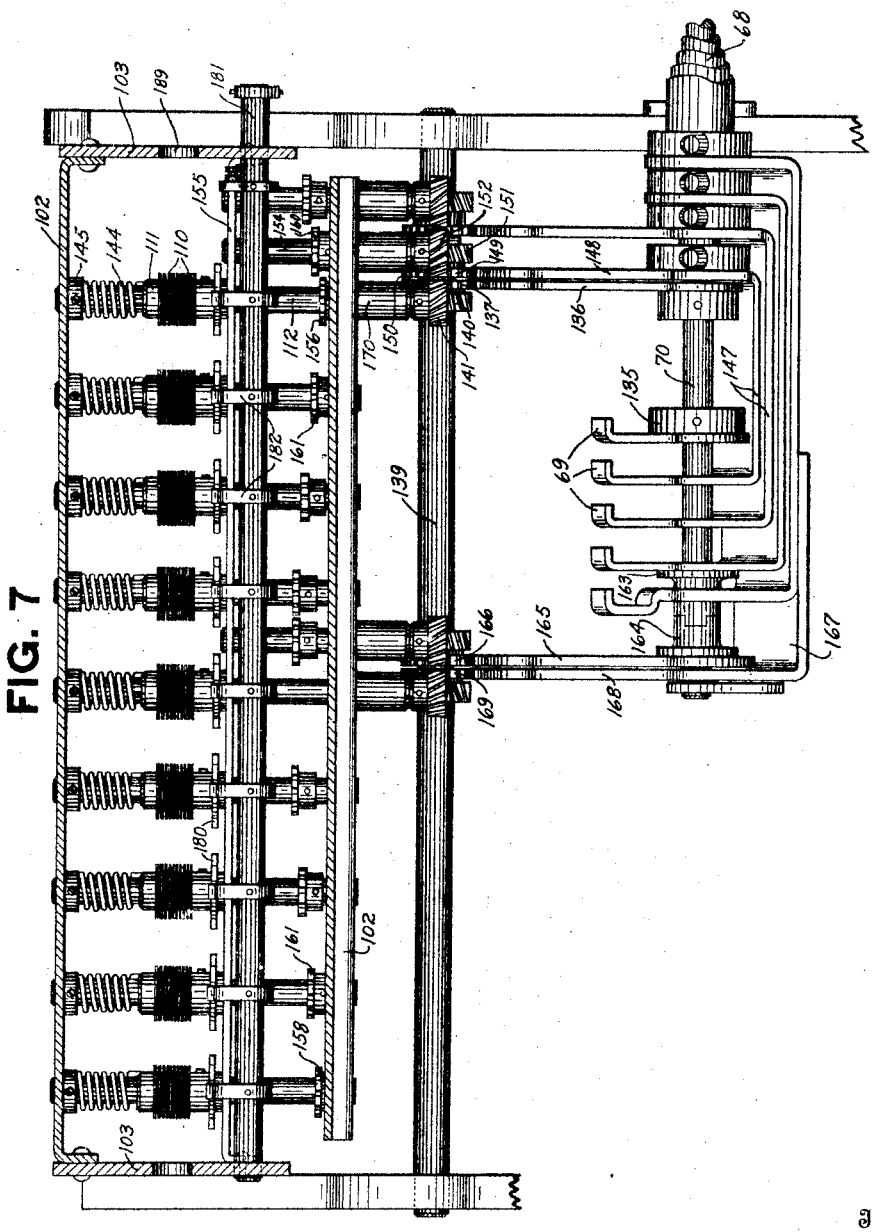

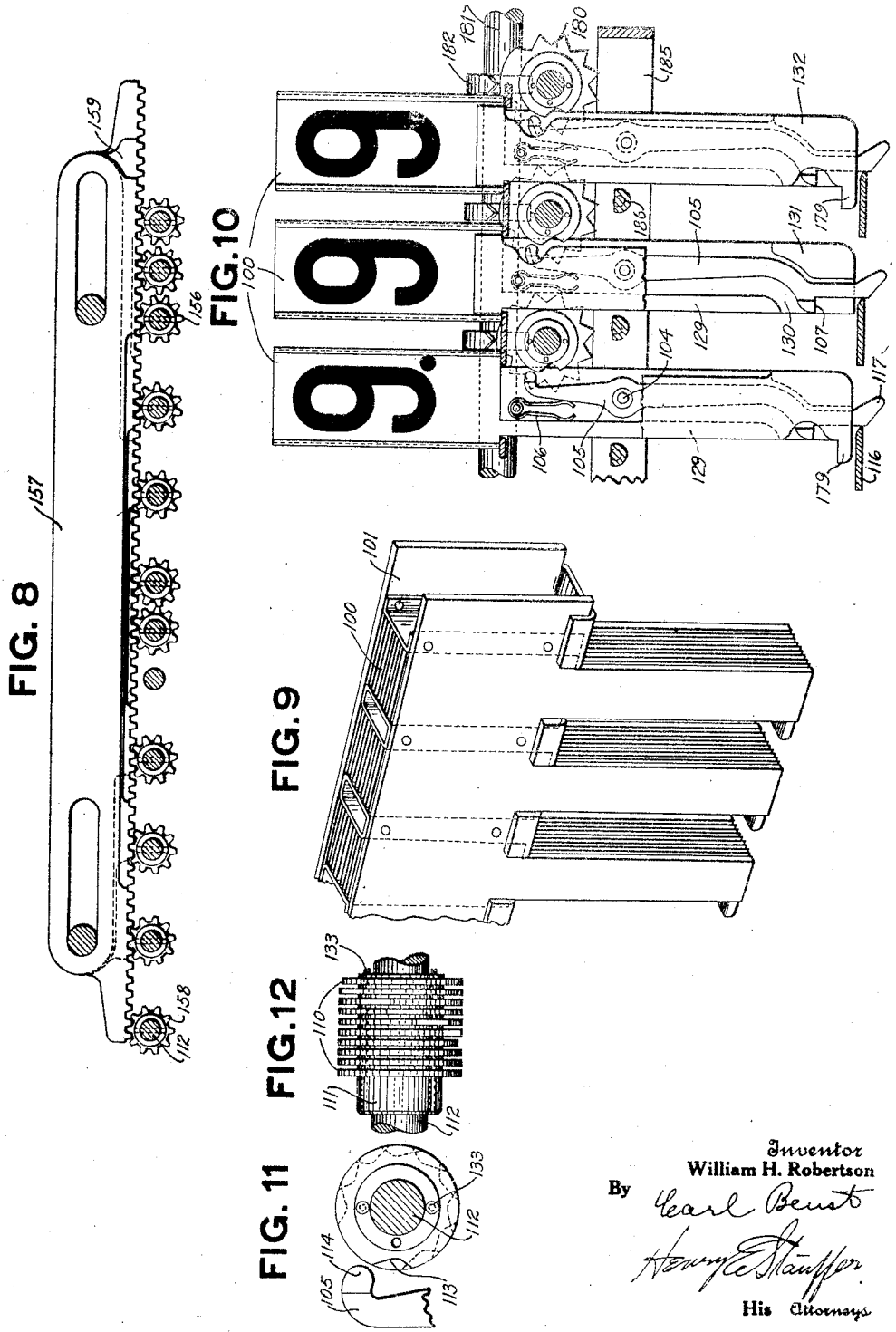

May 3, 1927.

W. H. ROBERTSON

CASH REGISTER

Filed March 11, 1924

Inventor
William H. Robertson
By Carl Benst
Henry E. Stauffer.
His Attorneys

May 3, 1927.

W. H. ROBERTSON 1,627,119

CASH REGISTER

Filed March 11, 1924      8 Sheets-Sheet 8

Inventor
William H. Robertson

By Earl Beust

Henry E Stauffer

His Attorneys

Patented May 3, 1927.

1,627,119

UNITED STATES PATENT OFFICE.

WILLIAM H. ROBERTSON, OF DAYTON, OHIO, ASSIGNOR, BY MESNE ASSIGNMENTS, TO THE NATIONAL CASH REGISTER COMPANY, OF DAYTON, OHIO, A CORPORATION OF MARYLAND.

CASH REGISTER.

Application filed March 11, 1924. Serial No. 698,447.

This invention relates to cash registers and more particularly to the indicating mechanism thereof.

The principal object of this invention is to provide novel indicating mechanism for cash registers.

One object of this invention is the provision of means for selecting and exposing the indicators under the control of the totalizer.

Another object of this invention is the provision of means for selecting and exposing the indicators under the control of item entering mechanism.

With these and incidental objects in view, the invention consists of certain novel features of construction and combinations of parts, the essential elements of which are set forth in appended claims and a preferred form of embodiment of which is hereinafter described with reference to the drawings which accompany and form part of this specification.

Of said figures:

Fig. 1 is a section through the machine taken just inside of the right hand side frame, and shows the use of the invention to indicate totals.

Fig. 2 is a section taken just outside of the right hand side frame.

Fig. 3 is a detail of the mechanism for operating the indicator flash.

Fig. 4 is a side elevation of the operating crank and mechanism connected thereto.

Fig. 5 is a rear elevation of the machine, partly broken away.

Fig. 6 is a section taken on line 6—6 of Fig. 5.

Fig. 7 is a top plan view of a portion of the indicator selecting mechanism.

Fig. 8 is a side view of the racks used in giving both back and front indicators the same adjustment.

Fig. 9 is a detail perspective view of a portion of the indicator box.

Fig. 10 is a detail view of three of the groups of indicators and their selecting mechanism.

Fig. 11 is a detail rear view of the selecting disks and one of the levers which cooperates therewith.

Fig. 12 is a side elevation of one of the groups of selecting disks.

Fig. 13 is a sectional view of a machine showing the indicator mechanism used to indicate items.

Fig. 14 is a detail view of the means for actuating the selecting disk aliners shown in Fig. 13.

Figure 15:
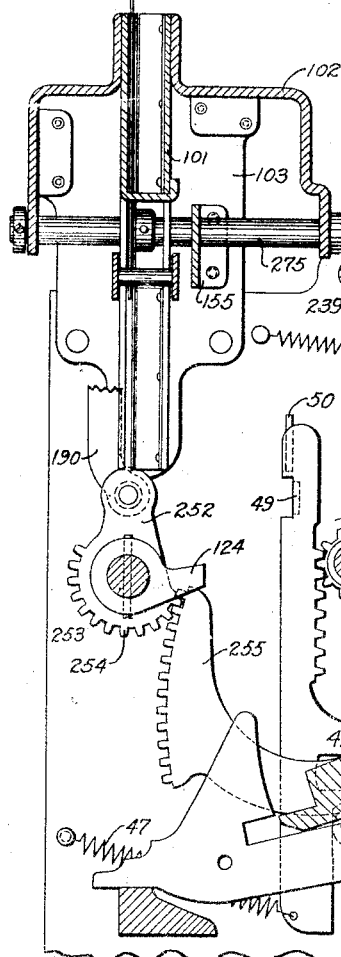
Fig. 15 is a section through the machine shown in Fig. 13, showing the means for selecting a clerk's indicator by the clerk's key.

One form of this invention, illustrated in Figs. 1 to 12, inclusive, is shown embodied in a machine of the type shown in Letters Patent of the United States No. 1,556,957, issued to William H. Robertson, October 13, 1925.

The embodiment illustrated in these figures comprises the usual amount keys, means for entering amounts in a totalizer and for printing the same, and means for printing the total of amounts entered, the printing means above mentioned being simply indicated in this application, as they are fully shown and described in the above mentioned applications. In addition, mechanism is provided for indicating the total amount. A flash device, which covers the indication while items are being entered by the amount keys, is also provided.

Referring especially to Fig. 1, the invention is shown in connection with the well known lever key type of machine. The keys 30, arranged in denominational groups, as shown, are pivoted on a transverse rod 31 carried by the side frames of the machine, and at their rear ends are notched to cooperate with a lip on a key coupler 32, for purposes well known in the art. Uprights 33 connected to the rear ends of the keys are provided with notches 34 for engaging rods 35 carried by a rocker member 36 supported on a shaft 37. There is a rocker member for each denominational group of keys 30 and each of the members is operatively connected to its registering segment or totalizer actuator 38. The notches in the uprights 33 are located to transmit amounts of movement to the actuators proportionate to the number of units represented by the keys to which said uprights are connected.

The totalizer actuators are normally in mesh with gears 39 which are operatively connected with the item type wheels (not shown) by a tube line 40 to print the items on an issuing receipt.

The key coupler 32, before referred to, is pivotally mounted in the side frames and rests upon the rear ends of the keys from which it receives its movement. The right hand end of the key coupler carries a roller 41 (Fig. 15) which cooperates with a slot in a driving member 42 guided on a stud 43 projecting from the frame of the machine. The driving member is provided with opposing racks adapted to be thrown into mesh alternately with a gear 45 on a cam shaft 46 to move the shaft in a clockwise direction. The engagement of the racks with the gear is effected and maintained by a spring 47 and a spring-drawn arm 48 and a flange 49 on the rack and a flange 50 on the frame, operating in the usual manner.

The amounts represented by the keys depressed are entered on a totalizer 56 (Fig. 1), which is of a well known type and will be but briefly described.

The totalizer elements comprise pinions 57 rigid with the gear wheels 58 and the other necessary elements supported on the turn-to-zero shaft 59. The shaft is provided with a groove to cooperate with spring-pressed pawls (not shown) on the totalizer elements to turn the totalizer to zero in the usual manner.

The totalizer is rocked into mesh with the actuators and transfers are effected by mechanism so well known in this type of machine that it will not be described here.

The amount accumulated on the totalizer is ascertained by a printing and indicating operation. For this purpose, mechanism is provided for setting up total type wheels to print the amount on the totalizer and for selecting indicating elements to display the the amount.

To accomplish this purpose, the totalizer comprises a plurality of stepped plates 60 (Fig. 1) rigid with gear wheels 61 mounted on a rod 62 in the totalizer frame and meshing with the gears 58 above mentioned.

The total type wheels (not shown) are located on the right hand side of the machine and are connected by a tube line 63 (Fig. 2) with gears 64 in mesh with segment gears 65 rigidly connected with segment gears 66 in mesh with segment gears 67. The segment gears 67 are connected by a tube line 68 (Fig. 7) to a plurality of arms 69, which are adapted to be moved into engagement with steps on the disks 60 of the totalizer. The tube line 68 is supported by a rod 70 which actuates the units arm 69 and is supported by a bracket 71 carried by the right hand side frame and by a bracket 72 supported by a cross bar 73 (Fig. 1).

The steps on the stepped plates 60 are so located that the type wheels will be set in accordance with the amount on the totalizer when the arms 69 are moved into contact therewith. The total indication is also selected by the stepped plates 60, as will hereinafter be described.

Also integral with the segment gears 65 are segment gears 80 which mesh with segment gear levers 81 provided with portions 82 connected by tension springs 83 to a rocking member 84. The springs are normally restrained against moving the arms 81, and therefore the total type wheels, by a yoke member 85 connected by a link 86 to said rocking member 84. The member 84 is first rocked clockwise and then counter-clockwise by cams 87 secured on a driving shaft 88 driven by a gear 89 (Fig. 4). The gear 89 meshes with a pinion 90 which is integral with a crank handle 91. Two complete rotations of the crank handle will rotate gear 89 and shaft 88 one complete revolution. As the rocking member 84 is moved clockwise, the springs 83 are permitted to function to set up the total type wheels in accordance with the amount on the totalizer. The type wheels are held in alined position while impressions are being made by the usual alining pawls 92 engaging notched plates 93 secured to type wheel gears 64. These pawls are supported in a frame member 94 pivoted on a rod 95 and actuated by a cam 96 on the driving shaft 88. The cam 96 is fast on the driving shaft 88 and receives one counter-clockwise rotation on each totalizing operation. One arm 79 of frame member 94 extends downwardly, and carries a roller 97 which cooperates with the periphery of cam 96. As this cam rotates, a high spot thereon comes in contact with the roller 97 and rocks the frame 94 and pawls 92 into alining position. As the roller 97 leaves the high spot, a pin 98 engages with a hook portion 99 of the arm 79 and positively moves it to the left in Fig. 2 to disengage the alining pawls. This movement is assisted by a spring 78 stretched between arm 79 and any convenient point of the mechanism.

*Indicators.*

The amount accumulated in the totalizer is indicated at the time the total is printed, and the indicators are adjusted under the control of the totalizer elements by the same mechanism that adjusts the total type printing wheels, above mentioned.

The indicator tablets 100 (Fig. 10) are located in groups of ten digits each. There are nine of these groups. The four groups on the right, together with the fifth or center group, indicate toward the front of the machine, while the four on the left, together with the center group, indicate toward the back of the machine. The indicators are carried by an indicator box 101 (Fig. 9), which is supported by indicator supporting members 102 carried by two plates 103 on each side of the machine fast to the side frames. The indicators are slidable vertically in the indicator box and have shoulders formed thereon which cooperate with portions of the box to limit the downward movement of the tablets.

As can be seen in Fig. 10, each of the indicator tablets comprises a tablet portion proper, upon which the appropriate numeral is painted, and a downwardly extending portion 129. Attached to the back of the tablet is a thin steel plate 130. At its lower end the plate 130 carries a spacing plate 131. Another thin plate 132 is then secured to the tablet, thereby leaving a hollow portion between the plates 130 and 132. Located in each of the hollow portions and pivoted on a stud 104 carried by said plates, is a lever 105. The spring 106 constantly tends to rock the lever in a clockwise direction in order to permit a shoulder 107 formed near its lower end which is thickened to withstand wear to project through an opening in the edge of the tablet between the plates 130 and 132. Means are provided which will cooperate with the shoulders 107 of the levers 105 and raise any selected indicator tablet to its exposed position if its lever 105 has been rocked sufficiently to permit the shoulder 107 to extend beyond the edge of the tablet. Means is provided also for permitting only a certain selected one of each group of tablets to be operated. To accomplish this it is necessary to prevent all of the levers 105, except that appropriate to the desired tablet, from being rocked by their springs 106. Means for selecting an indicator tablet in each group will now be described.

Appropriate to each of the groups of indicator tablets 100 are a plurality of controlling disks 110 (Figs. 11 and 12). These disks are attached to the side of a collar 111 which is loosely mounted on a shaft 112 supported by the indicator frame 102 (Fig. 1). The disks are spaced apart by spacing disks and are all connected and made integral with the collar 111 by two bolts 133. Each of these disks has a cut-away portion 113 in its periphery, the cut-away portions being spaced successively about the peripheries of the disks of each set, from 0 to 9. There is one of these disks in the plane of each of the levers 105 carried by the tablets 100. It can be seen from Fig. 11 that when the disks are positioned, the cut-away portion on a disk corresponding to the desired indicator tablet is brought into a position in which a nose 114 on the upper end of each of the levers 105 can enter the cut-away portion of the disk, under the influence of its spring 106. As only one of the cut-away portions will be in cooperative position with one of the levers 105, it is evident that only one indicator tablet in each group can be selected during an operation. The remainder of the levers 105 will contact with the full periphery of their corresponding disks and a clockwise movement thereof (Fig. 10) will be prevented.

Means are provided for holding all of the levers 105 out of contact with the peripheries of their corresponding disks during the time when the disks are set. After the disks have been set, this means is rendered ineffective and the levers are then controlled directly by their disks. This means comprises a bar 115 (Figs. 5 and 6) which has laterally extending portions 116 which cooperate with extensions 117 on the ends of the levers 105. These extensions extend below the lower ends of the tablets. In Figs. 5 and 10, the bar 115 with portions 116 is shown in its normal position, in which it will contact with extensions 117 and prevent any clockwise movement of the levers 105. After the disks 110 have been set, it is necessary to move the bar 115 laterally of the machine in order to permit the selected lever 105 to cooperate with its disk and assume a position in which the indicator tablet can be raised. This is accomplished in the following manner. The bar 115 is pivotally connected to an arm 109 (Fig. 5), which is pivoted to a hanger 118 riveted to the indicator supporting frame 102. At its other end, the bar 115 is pivoted to one end of a bell crank 119, which is in turn pivoted to a hanger 120 also supported by the indicator frame 102. Pivoted to the other end of the crank 119 is a link 121, which at its lower end is bent at right angles and has a slot through which a shouldered stud 122 projects. Fast on a shaft 123 is an arm 124 which is adapted to cooperate with a shoulder 125 on the link 121. This shaft is rotated in a clockwise direction (Fig. 6) by mechanism which will be hereinafter described, and when this occurs the arm 124 strikes the shoulder 125 and lowers link 121, thereby rocking the bell crank 119 and moving bar 115 toward the left, as seen in Fig. 5. The bar 115 is retained in its moved position by means of a pawl 126 which is pivoted on a downwardly extending portion of the hanger 120 and which at its opposite end has a shoulder adapted to cooperate with a flattened stud 127 fast on an extension of the bell crank 119. The pawl 126, constantly under spring tension, moves in a counter-clockwise direction, so that when the bar 115 is moved toward the left, as above described, the shoulder on the pawl will cooperate with the flattened stud 127 and retain the bar in its moved position. The pawl 126 has a downwardly extending portion, on the end of which is mounted a stud 128. It is evident from Fig. 6 that when the arm 124 is returned in a counter-clockwise direction to its home position, it will strike the stud 128 and thereby raise the pawl sufficiently for the shoulder thereon to be disengaged from the stud 127. Thereupon, the bar 115 will be returned to its normal position under spring tension. The thin steel plate 132 for each tablet is cut away along its right hand edge (Fig. 10) so as not to interfere with its corresponding disk 110. The other plate 130 is not cut away, however, and extends between its appropriate disk and the disk just behind it, and thereby prevents any misalinement between the disk and its lever 105.

By referring to Fig. 2, it will be apparent that the rocker 84 will have been rocked into its forward moved position, after the cam has rotated approximately 60°. This movement as stated before permits adjustment of the total type wheels under control of the totalizer. The cam 197 which operates the retaining bar 115 for the levers 105 of the indicator tablets, is so formed that the retaining bar will not be moved into its completely ineffective position before the cam 197 has moved approximately 90°. It is thus clear that the retaining bar 115 retains the levers 105 out of engagement with the disks 110 as the disks are being adjusted and for an ample time thereafter to prevent any interference of the levers 105 with the proper adjustment of the disks 110.

The means for moving the selecting disk 110 differentially under the control of the totalizer elements will now be described. It will be remembered that each totalizer element has attached thereto one of the stepped plates 60. These plates are rotated with the totalizer elements and when a total is to be taken from a totalizer the fingers 69 are moved clockwise (Figs. 1 and 2) until the bent ends thereof come into contact with whichever one of the steps has been positioned beneath it. In this way each of the fingers 69 is moved differentially to an extent equal to the complement of the amount upon its appropriate totalizer wheel. The selecting fingers 69 are clearly shown in Fig. 7. The one farthest to the right, as seen in this figure, cooperates with the units totalizer wheel, and it is therefore necessary that this finger be connected with the selecting disks for the units indicators. This finger is attached to a hub 135, which is fast on the shaft 70. Also fast on this shaft 70 is an arm 136 carrying a segment gear 137 (Fig. 1). This segment gear meshes with a pinion 138 loosely mounted on a shaft 139 supported by the machine side frames, and is fast to the side of a spiral pinion 140 (Fig. 7), which in turn meshes with another spiral pinion 141 fast on shaft 112 appropriate to the set of disks for the right hand or front units indicators. It is, therefore, evident that when the units finger 69 is moved, the movement will be transferred through the shaft 70, arm 136, segment 137, pinion 138, spiral pinion 140, and spiral pinion 141 to the shaft 112. Each of the shafts 112 carries a pin 142 (Fig. 1) which projects through a slot 143 in the hub 111 supporting the disks 110. A coil spring 144 surrounds the shaft 112 and at its rear end is anchored in a collar 145 fast on said shaft. At its forward end the spring engages with an opening in the end of the hub 111 for a purpose later set forth. When the shaft 112 is rotated in counter-clockwise direction, as viewed from the front, the pin 142 which is in contact with the end of the slot 143 will rotate the collar 111 and thereby the disks 110 into a position corresponding to the amount on the totalizer wheel.

The units of cents shaft 112 for the front indicators is driven directly from the units of cents finger, as above described. Fast on the shaft 112 is a gear 156. Cooperating with this gear is a rack 157 (Fig. 8) which also meshes with a gear 158 fast on the left hand one of the shafts 112 which shaft carries the selecting plates for the units of cents indicator group which indicates toward the rear of the machine. It is essential, of course, that both the front and back indicators corresponding to the same denomination be actuated simultaneously to the same extent, and this is accomplished by means of the rack just above described. All of the groups of indicators and selecting plates therefor are duplicates of those for the front indicators, and therefore no further mention need be made thereof.

The second finger from the right, as seen in Fig. 7, is connected by a yoke 147 to arm 148, identical with the arm 136. This arm carries a segment gear 149 which meshes with a pinion 150 fast to the side of a spiral pinion 151, meshing with another spiral pinion 152, fast on a shaft 154, supported by the indicator frame 102, and by a bracket 155 carried by said indicator frame.

A rack 159 similar to the rack 157, above described, cooperates with a gear 160 fast on shaft 154. This rack also cooperates with gears 161 on the shafts 112 appropriate to the tens of cents indicator groups for both front and back indicators. It is therefore evident that the adjustment of the finger 69 by the tens of cents totalizer wheel will be transmitted, through the above described mechanism, to the selecting plates for both the front and back tens of cents indicators.

The third finger 69 from the right, as seen in Fig. 7, is for the units of dollars totalizer wheel, and it sets up the units of dollars indicators both front and back by similar means to that just described with reference to the tens of cents mechanism. It is therefore thought to be unnecessary to further describe this mechanism.

The fourth finger from the right appropriate to the tens of dollars wheel has a hub 163 fast thereto, which is connected with a similar hub 164 by a clutch connection. Fast to the hub 164 is an arm 165 carrying a segment gear 166. The movement imparted to the segment gear 166 by the finger appropriate to the tens of dollars totalizer wheel, is transmitted by mechanism similar to that above described, to the tens of dollars indicators both front and rear by means of a suitable rack, shown in Fig. 8.

The last finger corresponds to the hundreds of dollars totalizer wheel and is connected by means of a yoke member 167 to an arm 168 and a segment gear 169. This segment gear co-operates with a pinion and two spiral pinions identical with those above described, and differentially sets the selecting disks 110 for the hundreds of dollars indicator group. This group is the center group, as seen in Fig. 7, and it is therefore possible to indicate both toward the front and rear with the same indicators, and therefore only the one group is provided.

After all of the groups of selecting disks are differentially positioned, they are alined, and the mechanism for accomplishing this function will now be described. Fast to each of the hubs 111 which support the selecting disks is a notched disk 180 (Figs. 1, 7 and 10). Cooperating with these disks are alining arms 182 which are normally out of engagement with the notched disks 180. These aliners are mounted on a shaft 181. They are rocked into engagement with the disks 180 at the same time that the alining pawls 92 are operated to aline the total type wheels. One side of the frame 94, which supports the pawls 92, has an upwardly extending portion 183 (Fig. 2). Fast on the shaft 181 is a downwardly extending arm 184 which lies in the plane of the arm 183. When the pawls 92 are rocked counter-clockwise (Fig. 2), as above described, the arm 183 will contact with an arm 184 and will thereby rock the shaft 181 clockwise, which will bring the pointed ends of the alining arms 182 into engagement with the notched disks 180 for each group of indicator selecting disks and will, therefore, aline these disks properly. The aliners 182 remain in engagement with the notched disks 180 for a short time after the shaft 112 have started to rotate reversely to their normal positions. This is permitted by the slot and pin connection between the shafts 112 and hubs 111 which carry the selecting disks. When the aliner is withdrawn, the spring 144 will rotate the disks until the pin assumes the position in the end of the slot 143, as shown in Fig. 1.

Mechanism is provided to lower the indicators which were exposed at the last preceding total printing operation after the disks 110 have been differentially positioned, in accordance with the amount standing on the totalizer, and to raise the selected indicators to an exposed position. This mechanism will now be described.

An indicator lifter 185 (Figs. 5 and 6) is provided which extends laterally across all of the groups of indicators. It is composed of two side plates and two end plates. Extending between the two side plates of the lifter, adjacent each of the groups of indicator tablets, is a short, flattened rod 186 which is adapted to cooperate with the shoulder 107 of the selected indicator tablet 100 in each group. This mechanism is clearly shown in Fig. 10. The end plates of the lifter extend upwardly and have studs 187 and 188 which project through slots 189 in the end plates of the indicator frame 102 and serve to guide the lifter in its vertical movement. Pivoted to the stud 187 at each end of the lifter is a link 190 which, at its lower end, is pivoted to an arm 191 fast on the shaft 123. Also fast on the shaft 123 is a partial gear 192, with which a segment gear 193 carried by an arm 194 co-operates. The arm 194 is fast on one end of a short shaft 195 which is supported by the right hand side frame of the machine and which upon its opposite end carries an arm 196 (Figs. 2 and 5). This arm carries a roller which cooperates with a cam groove in a cam disk 197 fast on a shaft 198 supported by the machine side frames. This shaft and cam 197 are given a complete clockwise rotation upon every totalizing operation by means of a gear 199 also fast on the shaft 198 which meshes with the gear 89, above mentioned (Fig. 4). Upon the clockwise rotation of the cam disk 197, the arm 196 will be rocked counter-clockwise, which movement will rock the arm 194 and segment 193 counter-clockwise (Fig. 6) and rotate the arm 191 clockwise. This movement, through the link 190, will lower the indicator lifter 185 and will thereby bring the last exposed indicators back to their normal lowered positions. As the cam disk 197 continues its movement, the segment gear 193 will be returned to its normal position, as shown in Fig. 6, which will raise the indicator lifter to the exposed position. As the lifter is raised, the rod 186 corresponding to each of the groups of indicator tablets will engage with the shoulders 107 of the levers 105 of the selected indicator tablets, which shoulders have been positioned in the path of the rods 186 and will thereby raise the selected indicator tablets to a position in which they may be seen through glass covered openings in the front and back of the cabinet. The plates 132 of each indicator have projections 179 which will be engaged by the studs 186 on the downward movement of the lifter to positively lower the exposed indicators.

A flash mechanism is provided which will obscure the indicators during item-entering operations, but which will be released and withdrawn upon total printing operations. This flash mechanism consists of front and back members joined at their ends to form a rectangular box 205 (Fig. 2). The flash is supported at each end by uprights 206. It is guided in its vertical movement by the two upwardly extending portions 207 of the indicator supporting frames 102. Near their lower ends each of the uprights 206 is provided with a slot 208 through which project pins 209 mounted in the side frames. These slots and pins also serve to guide the flash in its vertical movement. Each of the uprights 206 at its lower end is bent to extend through a slot in the side frame and has a forwardly extending portion which rests on the lip of the key coupler 32. It is evident that upon the first item-entering operation, when one of the keys 30 is rocked, the key coupler will raise the flash 205 to a position in which it conceals all of the indicators. The flash is maintained in this raised position by means of a pawl 210 (Figs. 2 and 3) which is normally held in contact with the rear edge of the right hand upright 206 by means of a spring 211. When the flash is raised by the key coupler, the pawl 210 will be rocked clockwise due to the engagement therewith of the beveled surface of a shoulder 212 carried by the upright 206. It is evident that as soon as the shoulder 212 reaches a position above the pawl 210, the pawl will snap in beneath the shoulder and retain the flash in its raised position.

When a total is taken and a new indication is set, it is desired to lower the flash, and this is done in the following manner. The arm 196, previously described, which is rocked first counter-clockwise and then clockwise by the cam 197, has a projection 213 in engagement with a pin 214 carried by a downwardly extending portion of the pawl 210. It is evident that when the arm 196 is rocked counter-clockwise the projection 213 will engage the pin 214 and rock the pawl 210 out from beneath the shoulder 212 on the right hand flash upright, which will permit the flash to drop under the influence of gravity.

*Embodiment adapted for use in key-actuated machines.*

Having described this invention as applied to a machine adapted to print and indicate totals, an embodiment thereof will now be described which shows applicant's indicators used with a key-operated machine of the general type shown in Von Pein, No. 1,371,653, issued March 15, 1921. In this machine the indicators are used to indicate the items entered, instead of totals.

This machine, like the one before described, comprises a plurality of key levers 30 (Fig. 13) arranged in denominational groups, and all pivoted on the cross rod 31. Pivoted to the rear end of each key is an upright 33 having a notch 34 located in accordance with the value of the key. These notches engage rods 35 carried by rocker members 36 supported on a shaft 37. There is a rocker member for each denominational group of keys and each of the members is operatively connected to its registering segment or totalizer actuator.

The key coupler is similar to the one previously described, and no further description will be given here.

In this embodiment of the invention, the indicator selecting disks are set directly by the totalizer actuating segments. In Fig. 13 the units of cents indicators for indicating towards the front of the machine are shown. It can be seen that the segment 38 meshes with a pinion 220 (Fig. 18) fast on a shaft 221 supported by the machine side frames. Also fast on this shaft is a spiral pinion 140 which meshes with another spiral pinion 141 fast on a shaft 112. The remainder of the units of cents indicator selecting mechanism is very similar to that above described, and therefore it is thought to be unnecessary to repeat the description here. The same reference numerals as previously used will be applied wherever possible. The only difference between the selecting plates for this embodiment and those previously described is that these are normally in position for the zero indicator to be selected, whereas in the previously described embodiment the disks must be moved to the zero position to select the zero indicator.

Figure 18:
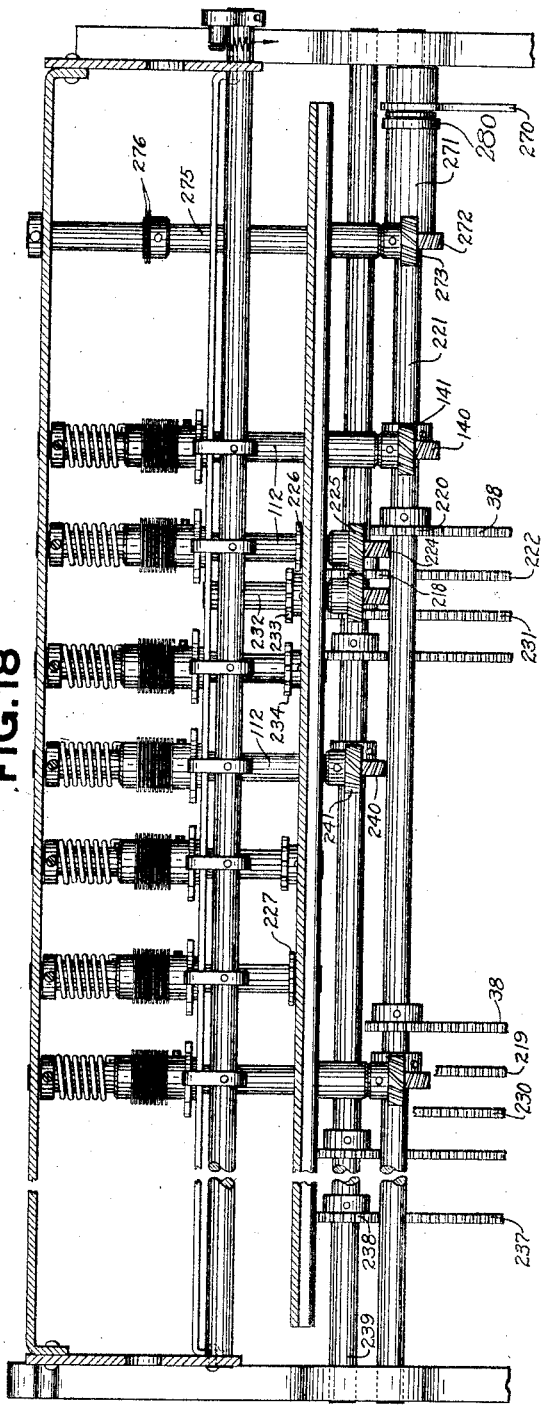
Fig. 18 is a top plan view of the groups of selecting disks and the means for setting them.

Fig. 18 shows a machine having two totalizers. A pinion, like pinion 220, is also fast on shaft 221 and is driven thereby to position the units of cents actuating segment 38 of the left hand totalizer. The shaft 221 also drives spiral gears and selecting mechanism for the units of cents indicator adapted to be seen from the rear of the machine.

The tens of cents rocker member (not shown) actuates a segment 222 (Fig. 18). This member is loose on the shaft 37, and is connected by a yoke (not shown) with a segment 219 for the left hand totalizer. The segment 222 meshes with a gear 218 fast to the side of a spiral pinion 224 secured to shaft 239 which in turn meshes with a spiral pinion 225 fast on the shaft 112 appropriate to the front indicator selecting plates. This shaft carries fast thereon a pinion 226 which cooperates with a laterally movable rack 228, similar to those above described, which in turn actuates a pinion 227 fast on the shaft 112 for the tens of cents rear indicators and thereby sets the selecting mechanism therefor.

Figure 19:
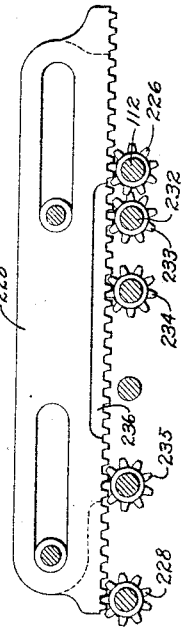
Fig. 19 is a detail side view of the racks for connecting the front and back indicators.

The units of dollars rocker member drives a segment 230 which is fast on shaft 37. Also fast on this shaft is a segment 231. The movement of the segment 231 is transmitted through the usual spiral gearing to a short shaft 232, which carries a pinion 233. This pinion is connected to a pinion 234 for the front indicators and also to a pinion 235 for the rear indicators by a rack 236 (Fig. 19).

The tens of dollars rocker member carries a segment 237 (Fig. 18) which meshes with a pinion 238 fast on a shaft 239. Also fast on this shaft is a spiral gear 240 which meshes with a similar gear 241 fast on a shaft 112 for the combination front and back indicator selecting mechanism, which is visible both from front and back.

It is evident from the above description that the indicator selecting plates are differentially set by the downward movement of the keys, which will select the proper indicator in each group for elevation.

After the selecting disks are positioned they are alined by mechanism identical with the alining mechanism above described, except in so far as its operating means is concerned. The alining shaft 181 (Fig. 14) carries a downwardly extending arm 245, which is fast thereon and which contacts with the upper end of a lever 246 pivoted on a stud 247 on the right hand side frame. The lower end of this lever carries a roller 248 which cooperates with a cam 249 fast on the revolution shaft 46. This shaft is given a complete counter-clockwise rotation (Fig. 14) on every operation, as above described. The cam 249 will rock lever 246 first counter-clockwise and then clockwise, which will in turn rock arm 245 and alining shaft 181 first clockwise and then counter-clockwise. This movement will rock the aliners into engagement with their appropriate notched disks, which will aline the selecting plates. The arm 245 is held in contact with the lever 246 by a spring 250 stretched between a projection on arm 245 and a pin on the side frame.

The means for exposing the selected indicators to view will now be described.

An indicator lifter is provided which is identically the same as the one described in connection with the previously described embodiment of the invention. It is not thought to be necessary, therefore, to again describe this mechanism here. The operating means for the lifter is different, however, and this will now be described.

Pivoted to the lifter on each side of the machine is a link 190, before described. At their lower ends these links are pivoted to arms 251 (Fig. 13) and 252 (Fig. 15), fast on a shaft 253 carried by the side frames.

The arm 252, which is on the right side of the machine, has teeth 254 integral with its hub, and these teeth mesh with a segment gear 255 screwed to the key coupler 32. It can readily be seen that when the key coupler is rocked clockwise by the depression of any of the keys, the segment gear will rotate the arm 252, shaft 253 and arm 251, which movement will lower the indicator lifter. Upon the return movement of the key coupler to normal, the parts will be rotated in the opposite direction, which will again raise the lifter and expose the selected indicators to view.

It is necessary to provide mechanism to assist the key coupler to return to its normal position. The weight of the coupler and the force of gravity are usually depended upon to do this, but as the additional load of raising the indicator lifter is placed on the key coupler in this construction, the following means are provided for assisting it.

Pivoted on a stud 256 (Fig. 13) is an arm 257. A powerful spring 258 is wrapped around stud 256 and cooperates with arm 257 to rock it in a clockwise direction. A pin 277 carried by the side frame acts as a stop for said arm. When the lifter is lowered during the down stroke of the key, as above described, the arm 251 comes into contact with the upper end of arm 257 and rocks this arm against the tension of the spring 258, thereby storing power in said spring. Then as the key coupler returns to normal, the spring 258, through arm 257, expends its power and helps to operate the indicator lifter, thereby taking a part of the load off of the key coupler.

Clerk's key.

Like many of the machines of this type that are provided with two totalizers, this machine has a key for selecting either one or the other of said totalizers, depending on which clerk is using the machine. The mechanism by which this key selects the desired totalizer is not shown or described herein, as it forms no part of this invention. The movement of this key also selects an indicator, bearing the clerk's initial, by means of novel mechanism, and this will now be described.

This clerk's key 259 is slidably mounted in a cross bar 260 supported by the side frames, and is normally maintained in its outer position by means of a spring 261 surrounding the key and bearing against a collar on said key and said cross bar.

When the key 259 is pushed in it is latched in its inner position. The inner end of the key carries a pin 262 cooperating with a slot formed in the lower end of an arm 263, which is pivoted on the side frame. At its lower end, this arm has a portion bent at right angles to the vertical portion thereof. When the key is pushed in, the arm 263 will be rocked clockwise (Fig. 15). The bent end thereof, as it moves in, will strike a spring-pressed pawl 264 which is pivoted on an arm 265 secured to the key coupler 32 and will rock said pawl clockwise until the bent portion reaches a notch cut in said pawl, whereupon the pawl will rock counter-clockwise and the key will be latched in its inner position.

The member 265 includes a concentrically arranged substantially vertically extending portion which moves behind said bent portion of the arm 263 as it is lowered upon raising movement of the key coupler. The parts maintain this relation until the key coupler reaches its home position, thus retaining the key 259 in its inner position during the operation of the machine. The recess in the pawl 264 is positioned so that it will miss the bent portion of the arm 263 as it reaches its home position. The arm 263 being free of the members 265 and 264 permits the return of the key 259 to its outer position.

Fast on the inner end of the key 259 is an upwardly extending member 266 which has a slot surrounding a pin 267 carried by an arm 268. This arm is clamped to a sleeve 269, which at its opposite end is connected to a type wheel. It is evident that the movement of the key will set up the proper clerk's initial on the type wheel.

Figure 16:
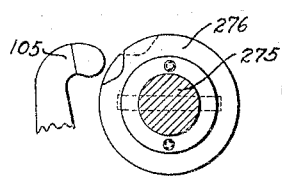
Fig. 16 is an end elevation of the selecting disks for the clerks' indicators.
Figure 17:
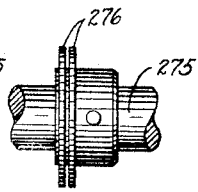
Fig. 17 is a side view of the selecting disks shown in Fig. 16.

The member 266 also carries a pin 279 which projects through a slot in an arm 270, loosely mounted on the shaft 221. Also loosely mounted on this shaft is a hub 271 (Fig. 18), which at its right hand end has a downwardly extending arm 280 fast thereto. This arm carries a pin 281 which projects through an opening in arm 270 (Fig. 15) and causes the movement of said arm to be given to the hub. At its left hand end the hub 271 carries a spiral pinion 272 meshing with a spiral pinion 273 fast on a shaft 275 similar to shafts 112. Fast on this shaft are two selecting plates 276 (Figs. 16, 17 and 18). Each of these selecting plates has a cut-away portion in its periphery with which a lever 105 of one of the two clerk's indicator tablets is adapted to cooperate.

With the key 259 in its outer position, as shown in Fig. 15, the selecting disk 276 for clerk "A," for instance, will be in position to receive the end of its lever 105 and thereby cause the "A" indicator to be raised. If, however, the key is pushed in, the pin 269 will rock the arm 270 clockwise, which movement will rock the hub 271 and spiral pinion to a like extent. The movement of this spiral pinion will rotate the pinion 273, shaft 275, and disks 276 so as to position the cutaway portion of the "B" disk in position to receive its lever 105.

The "A" disk will be positioned to prevent movement of its lever 105 and therefore upon the next operation the "B" indicator will be raised. Upon the next operation, the "A" indicator will be again raised, unless the clerk again operates the key 259.

While the form of mechanism herein shown an described is admirably adapted to fulfill the objects primarily stated, it is to be understood that it is not intended to confine the invention to the one form of embodiment herein disclosed, for it is susceptible of embodiment in various forms all coming within the scope of the claims which follow.

What is claimed is:

1. In a cash register, the combination of a single stationary indicator holder comprising a plurality of compartments, a plurality of indicator tablets located in each compartment, a totalizer having a plurality of denominational elements, and a plurality of groups of notched disks, one group for each compartment of indicator tablets for selecting a certain one of said tablets in each group for operation.

2. In a cash register, the combination of a single stationary indicator holder comprising a plurality of compartments, a plurality of indicator tablets located in each compartment, a totalizer having a plurality of denominational elements, a plurality of groups of notched disks, one group for each compartment of indicator tablets for selecting a certain one of said tablets in each group for operation, and a plurality of stepped plates one for each totalizer element for controlling the setting of said disks.

3. In a cash register, the combination of a single stationary indicator box containing a plurality of compartments, a plurality of vertically movable indicator tablets in each of said compartments, a lifting member common to all of said indicators, means carried by each of said indicator tablets for placing said tablets in cooperative relation with said lifting member, and a plurality of disks for selecting the tablet to be operated.

4. In a cash register, the combination of a single stationary indicator box containing a plurality of compartments, a plurality of vertically movable indicator tablets in each of said compartments, a lifting member common to all of said indicators, and a pivoted lever carried by each of said tablets and adapted to cooperate with the said lifting member to raise said tablets.

5. In a cash register, the combination of a single stationary indicator box containing a plurality of compartments, a plurality of vertically movable indicator tablets in each of said compartments, a lifting member common to all of said indicators, a pivoted lever carried by each of said tablets, and means for rocking certain of said levers into the path of said lifting member to accomplish the exposure of the selected indicator.

6. In a cash register, the combination of a single stationary indicator box containing a plurality of compartments, a plurality of vertically movable indicator tablets in each of said compartments, a lifting member common to all of said indicators, a pivoted lever carried by each of said tablets, and a spring for rocking said lever into the path of said lifting member.

7. In a cash register, the combination of a single stationary indicator box containing a plurality of compartments, a plurality of vertically movable indicator tablets in each of said compartments, a lifting member common to all of said indicators, a pivoted lever carried by each of said tablets, a spring for each of said levers for rocking it to effective position in the path of said lifting member, and means for preventing all but a selected one of said levers in each group from being rocked by its spring.

8. In a cash register, the combination of a single stationary indicator box containing a plurality of compartments, a plurality of vertically movable indicator tablets in each of said compartments, a lifting member common to all of said indicators, a pivoted lever carried by each of said tablets, a spring for each of said levers for rocking it to effective position in the path of said lifting member, means for preventing all but a selected one of said levers in each group from being rocked by its spring, and means for selecting which of said levers will be rocked.

9. In a cash register, the combination of a single stationary indicator box containing a plurality of compartments, a plurality of vertically movable indicator tablets in each of said compartments, a lifting member common to all of said indicators, a pivoted lever carried by each of said tablets, a spring for each of said levers for rocking it to effective position in the path of said lifting member, and a plurality of disks for selecting which of said levers will be rocked.

10. In a cash register, the combination of a single stationary indicator holder comprising a plurality of compartments, a plurality of indicator tablets carried in each compartment, a totalizer having a plurality of denominational elements, means for turning said totalizer to zero, a plurality of disks adapted to be positioned under the control of said totalizer elements upon their return to zero for selecting certain ones of said indicators for operation, and means for raising the selected indicators to their exposed position.

11. In a cash register, the combination of a single stationary indicator holder comprising a plurality of compartments, a plurality of indicator tablets carried in each compartment, a totalizer having a plurality of denominational elements, means for turning said totalizer to zero, a plurality of notched disks adapted to be differentially set under the control of said totalizer elements for selecting a certain one of said indicators of each group for operation, and means for raising said selected indicators to an exposed position.

12. In a cash register, the combination of a single stationary indicator holder comprising a plurality of compartments, a plurality of indicator tablets carried in each compartment, a totalizer having a plurality of denominational elements, means for turning said totalizer to zero, a plurality of notched disks for selecting a certain indicator in each group for operation, connections between said disks and said totalizer elements for setting said disks differentially upon the return to zero of said totalizer elements, and means for raising the selected indicators to an exposed position.

13. In a cash register, the combination of a single stationary indicator holder comprising a plurality of compartments, a plurality of indicator tablets carried in each compartment, a totalizer having a plurality of denominational elements, a plurality of groups of notched disks one group for each compartment of indicator tablets for selecting a certain tablet in each group for exposure, and lifting means for exposing said selected indicators to view simultaneously.

14. In a cash register, the combination of a single stationary indicator holder comprising a plurality of compartments, a plurality of indicator tablets carried in each compartment, a totalizer having a plurality of denominational elements, a plurality of groups of notched disks one group for each compartment of indicator tablets for selecting a certain tablet in each group for exposure, a plurality of stepped plates one for each totalizer element for controlling the setting of said disks, and a single lifting means adapted to cooperate with and raise all of the selected indicators simultaneously to their exposed positions.

15. The combination of an indicator tablet comprising front and back portions, and a lifting lever pivoted to and located between said portions.

16. The combination of an indicator tablet comprising front and back portions, a lifting lever pivoted to and located between said portions, and means exerting a constant effort to rock said lever in one direction.

17. In a machine of the class described, the combination of an indicating element comprising front and back portions, a lifting lever pivoted to and located between said portions, a spring exerting a constant effort to rock said lever in one direction, and means for normally preventing any movement of said lever by said spring.

18. In a machine of the class described, the combination of an indicating element comprising front and back portions, a lifting lever pivoted to and located between said portions, a spring exerting a constant effort to rock said lever in one direction, and a plate for normally preventing any movement of said lever by said spring.

19. In a machine of the class described, the combination of an indicating element comprising front and back portions, a lifting lever pivoted to and located between said portions, a spring exerting a constant effort to rock said lever in one direction, a plate for normally preventing any movement of said lever by said spring, and means for moving said plate to an ineffective position.

20. In a machine of the class described, the combination of an indicating element comprising front and back portions, a lifting lever pivoted to and located between said portions, a spring exerting a constant effort to rock said lever in one direction, a plate for normally preventing any movement of said lever by said spring, means for moving said plate to an ineffective position, and means for raising said indicator after said plate has been moved.

21. In a machine of the class described, the combination of an indicating element comprising a front and back portion, a lifting lever pivoted to and located between said portions, a spring exerting a constant effort to rock said lever in one direction, a plate for normally preventing any movement of said lever by said spring, a bell crank for moving said plate, an indicator lifting means, and means actuated by said lifting means for operating said bell crank.

22. In a machine of the class described, the combination of an indicating element comprising a front and back portion, a lifting lever pivoted to and located between said portions, a spring exerting a constant effort to rock said lever in one direction, a plate for normally preventing any movement of said lever by said spring, a bell crank for moving said plate to an ineffective position, and an indicator lifting means adapted to cooperate with a projection of said lever and raise said indicator when said plate is moved to its ineffective position.

23. In a machine of the class described, the combination of an indicating element comprising front and back portions, a lifting lever pivoted to and located between said portions, a spring exerting a constant effort to rock said lever in one direction, a plate for normally preventing any movement of said lever by said spring, and another means adapted to permit or prevent the movement of said lever.

24. In a machine of the class described, the combination of an indicating element comprising a front and back portion, a lifting lever pivoted to and located between said portions, a spring exerting a constant effort to rock said lever in one direction, a plate for normally preventing any movement of said lever by said spring, and a disk having a cut-away portion in its periphery in order to permit the movement of said lever.

25. In a machine of the class described, the combination of a single stationary indicator container having a plurality of compartments therein, a plurality of indicator tablets in each compartment, a totalizer, segments for actuating said totalizer differentially, and a plurality of disks operated by said segments to select indicator tablets for operation.

26. In a machine of the class described, the combination of a single stationary indicator container having a plurality of compartments therein, a plurality of indicator tablets in each compartment, a totalizer, segments for actuating said totalizer differentially, and a plurality of notched disks operated by said segments for selecting the indicators to be exposed.

27. In a machine of the class described, the combination of a single stationary indicator container having a plurality of compartments therein, a plurality of indicator tablets in each compartment, a totalizer, segments for actuating said totalizer differentially, and a plurality of disks adapted to be moved as a unit by said segments to select the indicator tablets to be operated.

28. In a machine of the class described, the combination of a single stationary indicator container having a plurality of compartments therein, a plurality of indicator tablets in each compartment, a totalizer, segments for actuating said totalizer differentially, a plurality of disks adapted to be moved as a unit by said segments, and a plurality of levers cooperating with said disks to determine which indicators will be exposed.

29. In a machine of the class described, the combination of a single stationary indicator container having a plurality of compartments therein, a plurality of indicator tablets in each compartment, means for selecting indicators for operation, a totalizer, segments for actuating said totalizer differentially, keys for operating said segments, a key coupler also actuated by said keys, and a segment fast to said key coupler for raising the selected indicators to their exposed positions.

30. In a cash register, the combination of a manipulative device having two positions of adjustment, an indicator tablet corresponding to each of said positions, and a pair of cam disks adapted to select one of said tablets for operation.

31. In a cash register, the combination of a manipulative device having two positions of adjustment, an indicator tablet corresponding to each of said positions, and a pair of disks directly connected to said device and adapted to be set thereby to select one of said indicators for operation.

32. In a cash register, the combination of a manipulative device having two positions of adjustment, an indicator tablet corresponding to each of said positions, a pair of disks directly connected to said device and adapted to be set thereby to select one of said indicators, and means for raising said indicator to exposed position.

33. In a cash register, the combination of a manipulative device having two positions of adjustment, an indicator tablet corresponding to each of said positions, a pair of disks directly connected to said device and adapted to be set thereby to select one of said indicators, means for raising said indicator to exposed position, and means for maintaining said indicator in its raised position until the next operation of the machine.

34. In an indicating element, the combination of a body portion comprising a tablet and a narrow strip extending downwardly therefrom, front and back plates attached to said body portion, and a lifting lever mounted between and pivoted to said plates.

35. In an indicating element, the combination of a body portion comprising a tablet and a narrow strip extending downwardly therefrom, front and back plates attached to said body portion, and an elevating member mounted between and attached to said plates.

36. In an indicating element, the combination of a body portion comprising a tablet and a narrow strip extending downwardly therefrom, front and back plates attached to said body portion, a lifting lever mounted between and pivoted to said plates, and a shoulder on said lever.

37. In an indicating element, the combination of a body portion comprising a tablet and a narrow strip extending downwardly therefrom, front and back plates attached to said body portion, a lifting lever mounted between and pivoted to said plates, and a shoulder formed on said lever adapted to extend through an opening between said plates.

38. In an indicating element, the combination of a body portion comprising a tablet and a narrow strip extending downwardly therefrom, front and back plates attached to said body portion, a lifting lever mounted between and pivoted to said plates, a shoulder on said lever adapted to extend through an opening between said plates, and means for normally rocking said lever to maintain said shoulder in its extended position.

39. In a machine of the class described, the combination of an indicating element comprising a front and back portion, a lifting lever pivoted to and mounted between said portions, a spring for rocking said lever in one direction, means for raising and lowering said element, and means operative upon said lowering movement to return said lever to its normal position.

40. In an indicating element, the combination of a body portion comprising a tablet and a narrow strip extending downwardly therefrom, front and back plates attached to said body portion, a lifting lever pivoted to and mounted between said plates, and a plate having a beveled surface adapted to cooperate with said lever on its downward movement to return said lever to its normal position.

41. In a machine of the class described, the combination of an indicating element comprising a front and back portion, a lifting lever pivoted to and mounted between said portions, a beveled portion near the lower end of said lever, a spring for rocking said lever in one direction, means for raising and lowering said element, and a plate having a beveled surface adapted to cooperate with the beveled portion of said lever on its downward movement to return said lever to its normal position.

42. In a cash register, the combination of a plurality of groups of indicators certain of said groups being exposed toward the front and certain groups towards the rear of the machine, a plurality of groups of selecting devices adapted to select an indicator in each group, means for setting certain of said groups differentially, and means for connecting said last mentioned groups of selecting devices with certain other groups.

43. In a cash register, the combination of a plurality of groups of indicators certain of said groups being exposed toward the front and certain groups towards the rear of the machine, a plurality of groups of selecting devices adapted to select an indicator in each group, means for setting the front indicator selecting groups differentially, and means for connecting said last mentioned groups of selecting devices with the rear indicator selecting devices.

44. In a cash register, the combination of a plurality of groups of indicators certain of said groups being exposed toward the front and certain groups towards the rear of the machine, a plurality of groups of selecting devices adapted to select an indicator in each group, means for setting certain of said groups differentially, and a plurality of racks for connecting said last mentioned groups of selecting devices with certain other devices.

45. In a cash register, the combination of a plurality of groups of indicators certain of said groups being exposed toward the front and certain groups towards the rear of the machine, a plurality of groups of selecting devices adapted to select an indicator in each group, means for setting the front indicator selecting groups differentially, and a plurality of laterally movable racks for connecting said last mentioned groups of selecting devices with the rear indicator selecting devices.

46. In a cash register, the combination of a plurality of indicator tablets, a plurality of selecting disks therefor, a hub carrying all of said disks, a shaft adapted to be given a variable movement to set said disks, and means for flexibly connecting said shaft and hub.

47. In a cash register, the combination of a plurality of indicator tablets, a plurality of selecting disks therefor, a hub carrying all of said disks and having a slot therein, a shaft adapted to be given a variable movement to set said disks, and a pin carried by said shaft and extending through said slot to flexibly connect said shaft and hub.

48. In a cash register, the combination of a group of indicator tablets comprising a main body portion, front and back plates fast thereto, a lever pivoted between said plates, and a plurality of selecting disks having notches therein and so arranged that each disk will overlap the said back plate of its corresponding indicator tablet to aline the nose of said lever with its notch.

49. In a cash register, the combination of a group of indicator tablets comprising a main body portion, front and back plates fast thereto, a lever pivoted between said plates, and a plurality of selecting disks interspersed between said tablets to aline the levers and corresponding disks.

50. In a cash register, the combination of a plurality of indicator tablets, and a corresponding number of tablet selecting disks arranged in interspersed relation therewith.

In testimony whereof I affix my signature.

WILLIAM H. ROBERTSON.